United States Patent [19]
Andersen

[11] 3,768,980
[45] Oct. 30, 1973

[54] FURNACE DESIGN
[75] Inventor: Per Heymann Andersen, Virum, Denmark
[73] Assignee: Haldor Frederik Axel Topsoe, Vedbaek, Denmark
[22] Filed: Sept. 16, 1971
[21] Appl. No.: 181,115

[30] Foreign Application Priority Data
Sept. 25, 1970 Great Britain.................. 45,882/70

[52] U.S. Cl............ 23/288 M, 23/277 R, 122/510, 248/58
[51] Int. Cl......................... B01g 9/04, F22b 37/24
[58] Field of Search..................... 23/288 M, 288 H, 23/288 K, 289, 277 R, 277 US; 48/196 R, 94, 95, 102 R, 105, 107; 196/110, 116, 133; 122/510; 165/82, 177, 178; 248/58, 60, 317, 54 R, 54 CS, 49, 55, 56, 59

[56] References Cited
UNITED STATES PATENTS
| | | | |
|---|---|---|---|
| 3,343,923 | 9/1967 | Regan et al. ..................... | 23/288 M |
| 3,413,960 | 12/1968 | Feliks et al. ........................ | 122/510 |
| 2,708,686 | 5/1955 | Bernard, Jr. et al............. | 248/58 X |
| 2,475,109 | 7/1949 | Pendleton .................. | 23/288 K UX |
| 3,460,924 | 8/1969 | O'Sullivan........................ | 23/277 R |

FOREIGN PATENTS OR APPLICATIONS
1,192,688  5/1970  Great Britain .................. 23/288 M Primary Examiner—Joseph Scovronek
Attorney—Arnold Robinson

[57] ABSTRACT

A furnace for catalytic, endothermic reactions comprising at least one row of substantially vertical reactor tubes in at least one furnace chamber, inlet pigtails compensating for thermal expansions of the reactor tubes, outlet means including at least substantially straight connecting pipes forming substantially right angles with said reactor tubes, and suspension means of said reactor tubes, said means being disposed at the lower end of said reactor tubes allowing a substantially frictionless movement of the lower ends of said reactor tubes in all directions within a substantially horizontal plane large enough to compensate for the thermal expansions of said outlet means in order to make the structure of the furnace chamber independent of thermal expansions of the reactor tubes and simultaneously simplify the outlet piping means.

8 Claims, 6 Drawing Figures

FURNACE DESIGN

The present invention relates to improvements in the design of a furnace for catalytic endothermic reactions. Examples of such catalytic endothermic reactions are conversions of hydrocarbons with or in the presence of steam for the production of hydrogen, synthesis gas, town gas, or olefin containing gasses. In particular, the invention relates to a system for supporting the reactor tubes at their base ends.

In general, a furnace for endothermic reactions consists of one or more combustion chambers provided with burners located on the chamber walls, roof and/or floor. A large number of alloy tubes are vertically disposed in the combustion chamber with their head ends extending through the chamber roof and possibly their base ends penetrating the chamber floor. In the usual manner, fluid reactants are introduced through an external inlet manifold system at the head ends, while the products are collected from the base end of the reactor tubes through a system of one or more outlet manifolds.

The main problems encountered in the design of a furnace for endothermic reactions are related to expansion and contraction of reactor tubes and outlet pipes and manifolds with changing temperatures. Other problems are related to the arrangements for supporting the reactor tubes at their base ends. Normally, the tubes are arranged in the furnace chamber in one or two rows. An outlet manifold for collecting the fluid products from the reactor tubes is located horizontally at right angles to the tubes. Temperature changes during heating and cooling of the furnace cause the reactor tubes and manifold to elongate and contract. While the reactor tubes can expand freely through the chamber roof, the tube-to-manifold connections must be constructed to compensate for the movements of the manifold, otherwise thermal stresses may eventually result in ruptures occurring.

In one prior art design, the tubes are directly secured to and supported by the manifold so that the tube bases are forced to follow the longitudinal movements of the manifold. However, since the head ends of the tubes do not follow these movements some thermal stresses will occur in the reactor tubes and in the tube-to-manifold connections, particularly if a large number of reactor tubes are connected to the same manifold. Furthermore, unrestricted movement of a manifold is not possible if it carries the full load of the reactor tubes. It is, therefore, also necessary to suspend the tube heads through a flexible arrangement, for example a counterweight and pulley arrangement or a spring arrangement, carrying all or a substantial part of the total load of the tubes.

In another prior art design, the reactor tubes are connected to the manifold through long pigtails which are flexible enough to allow elongation and contraction of the manifold, while the tube bases remain in their fixed positions. However, this is costly because the long pigtails have to be made of expensive heat resistant alloys.

It has been proposed to replace the long pigtails by short and straight connecting pipes and instead connect a guiding bar to the tubes so that the tube bases will move in accordance with the movements of the manifold. However, also this system requires that all or a substantial part of total tube load be carried by flexible supporting arrangement attached to each individual tube head. Such arrangements are complicated and costly and they require careful maintenance and inspection. Otherwise, permanent and troublefree functioning cannot be achieved.

It is an object of the present invention to provide a design of a furnace for catalytic endothermic reactions in which completely base supported reactor tubes are connected to an outlet manifold through simple straight pipes, making the catalyst more easily accessible through the top end of the reactor tubes, and making the structure of the furnace walls independent of thermal expansion of the reactor tubes and with smaller dimensions.

A further object of the invention is to simplify the arrangement of the outlet piping system making the connecting pipes independent of thermal expansions of the manifolds.

A further object of the invention is to reduce bending stresses in the outlet connecting pipes.

A further object of the invention is to provide means for individual adjustment of the reactor tubes.

According to the present invention I provide a furnace design in which the total load of each reactor tube is carried by suspension means attached to the tube bases, and allowing a substantially frictionless and horizontal movement of each tube base within an area large enough to compensate for the thermal elongations of the outlet means including straight connecting pipes and possibly manifolds.

The furnace design according to the present invention has a number of advantages over the prior art. Some of these advantages will be mentioned in the following. Other advantages will be understood by those skilled in the art.

The hitherto known supporting or suspension systems have involved the use of a counterweight or spring arrangement for carrying each indiviudal tube at its head end. Since such arrangements have to be located on the top of the furnace they are exposed to the influence of varying climatic conditions. Corrosion of vital parts is, therefore, likely to occur and it will be understood that such arrangements can only function properly, if all moving parts, for example in a pulley arrangement, are kept free of any restrictions. Frequent inspection and careful maintenance are, therefore, required.

Furthermore, some of the previous systems have included rigid tube-to-manifold connections which are rather sensitive to the unavoidable thermal stresses that tend to concentrate at critical positions, particularly in welded junctions. Frequent cracking of these junctions have, therefore, occurred in the past.

Use of flexible tube-to-manifold connections, possibly in combination with a system of fixed supports of each tube at its base end, has overcome some of the above disadvantages. However, a sufficient flexibility of the tube-to-manifold connections has only been achieved by use of long, bent pigtails. Since these have to operate at high pressure, for example above 20 atmospheres pressure, and at high temperatures, for example above 700°C, only expensive heat and pressure resistant alloys can be used. Therefore, this system is rather costly.

In the furnace according to the present invention a new and simplified supporting system is used and the outlet system is improved. The long and bent pigtails have been replaced by short, straight pipes which can still absorb the unavoidable individual bending of the vertical reactor tubes. All other stresses have been eliminated through a suspension system attached to the tube bases. This suspension is very simple and can be located at easily accessible positions underneath the furnace chamber. It is thus well protected against climatic influence and since the temperature here is slightly higher than ambient temperatures, because of radiant heat from the furnace chamber, the risk of corrosion has been considerably reduced. In addition, there are only slight movements in the system and maintenance is, therefore, simple.

Although the suspension system in accordance with the present invention is particularly suitable in cases where the effluent products from the reactor tubes are collected through a manifold, it can also be applied in cases where there is no outlet manifold. Such a situation exists where the effluent products from the catalytic endothermic reactor tubes are transferred to another furnace for further endothermic reactions possibly in the absence of a catalyst. In this case an outlet manifold may not neccessarily be required to collect the products from the first furnace before it is being transferred to the next furnace. However, the suspension system for supporting the catalytic endothermic reactor tubes in accordance with the present invention may still be applicable.

The support system and the tube-to-manifold connections in accordance with the present invention can be arranged so that only the supports themselves and the outlet manifolds are kept outside the combustion chamber, while the junctions between reactor tubes and connecting pipes are inside the chamber. In other cases it may be an advantage to keep the connecting pipes and their tube junctions entirely outside the combustion chamber. In this way they are easily accessible for inspection, maintenance, and repair. At the same time the risk of overheating junctions and manifolds has been eliminated. Furthermore, since junctions and manifolds are not in contact with the combustion products all types of fuels including residual fuel oils having a high content of sulphur and ash compounds such as vanadium and sodium compounds can be utilized to supply the heat for the endothermic reactions taking place in the tubes.

The new furnace design is, therefore, particularly suitable for utilization of compound tubes such as those described in our Indian Patent No. 131 894.

These compound tubes have on the outside a corrosion-resistant alloy while the inside is a pressure-resistant alloy.

In previously known furnace designs the above mentioned advantages could be achieved only at increased investment and operating costs. A considerable reduction of these costs is a result of the present invention. In the previous design with base supported tubes and external pigtails and manifolds, the pigtails were rather long and only 20–30 tubes could be connected to one manifold. In the modern furnace design, however, each combustion chamber may contain up to 150 tubes or even more. In the previous design these tubes were, therefore, first connected to a number of separate manifolds which again were connected to a main transfer line. This transfer line was internally insulated by refractory bricks in order for its steel shell to be kept at ambient temperature and consequently free of thermal expansions. The furnace design in accordance with the invention allows simplification of the outlet system. The long and bent outlet pigtails can be replaced by short, straight pipes. Since pigtails or pipes connecting the tubes with manifold have to be made of an expensive alloy such as Incoloy 800, this change results in a considerable saving in capital costs. At the same time the pressure drop across the outlet system is reduced. The system of a number of separate manifolds connected to a refractory-lined transfer line can be replaced by one single manifold which at the same time is the main transfer line for the total effluent products. Consequently, the refractory-lined transfer line is omitted which results in a saving of capital as well as in maintenance costs.

In order that the invention should be better understood it will be described in further detail and in particular with reference to the attached schematic drawings. The description and drawings represent examples of furnace designs in accordance with the present invention. However, other ways of carrying out the furnace design can be used without deviating from the scope of the invention.

Figure 1:
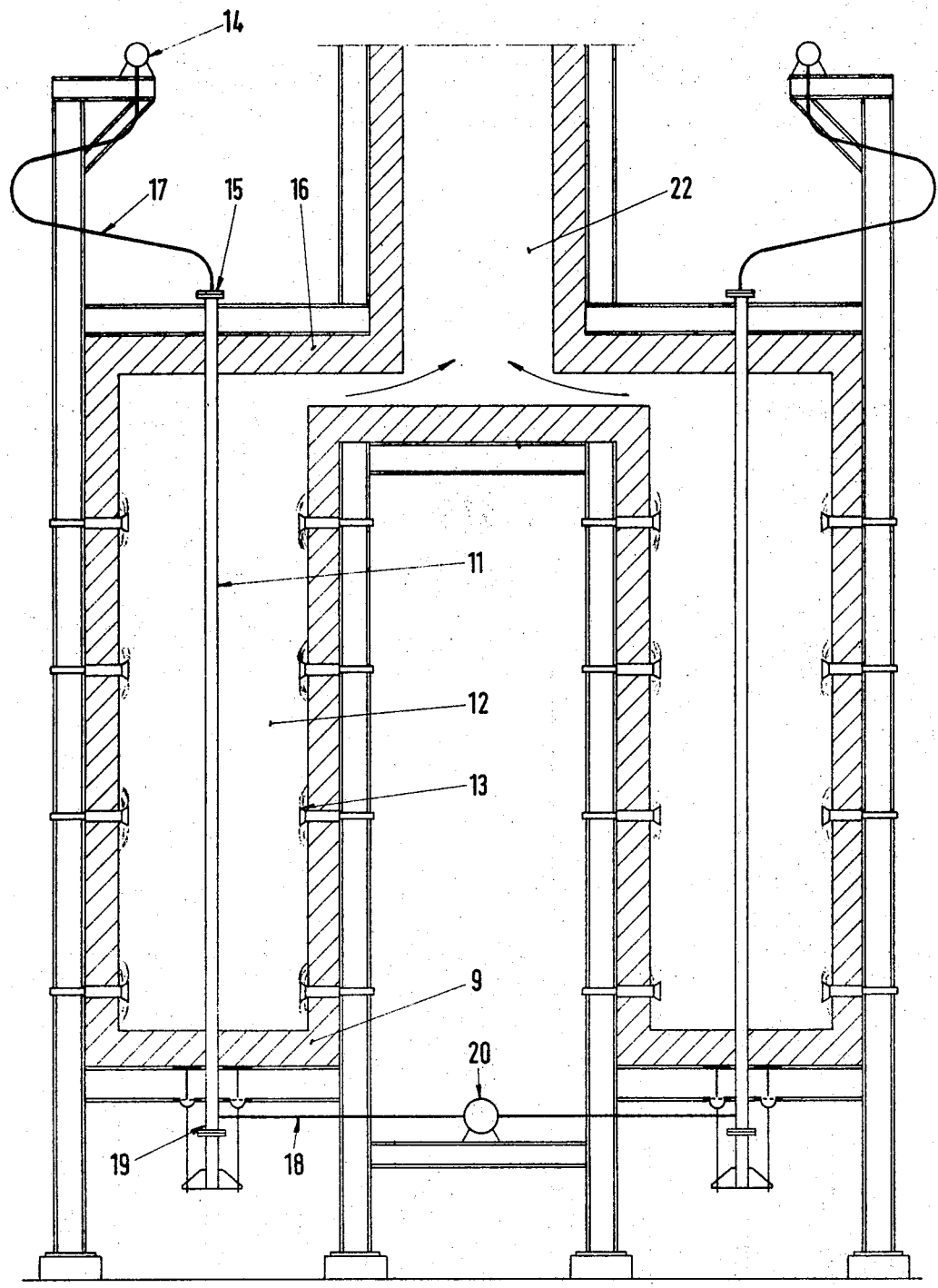
FIG. 1 is a cross-section through a furnace with two combustion chambers each containing one row of vertically disposed tubes.
Figure 2:
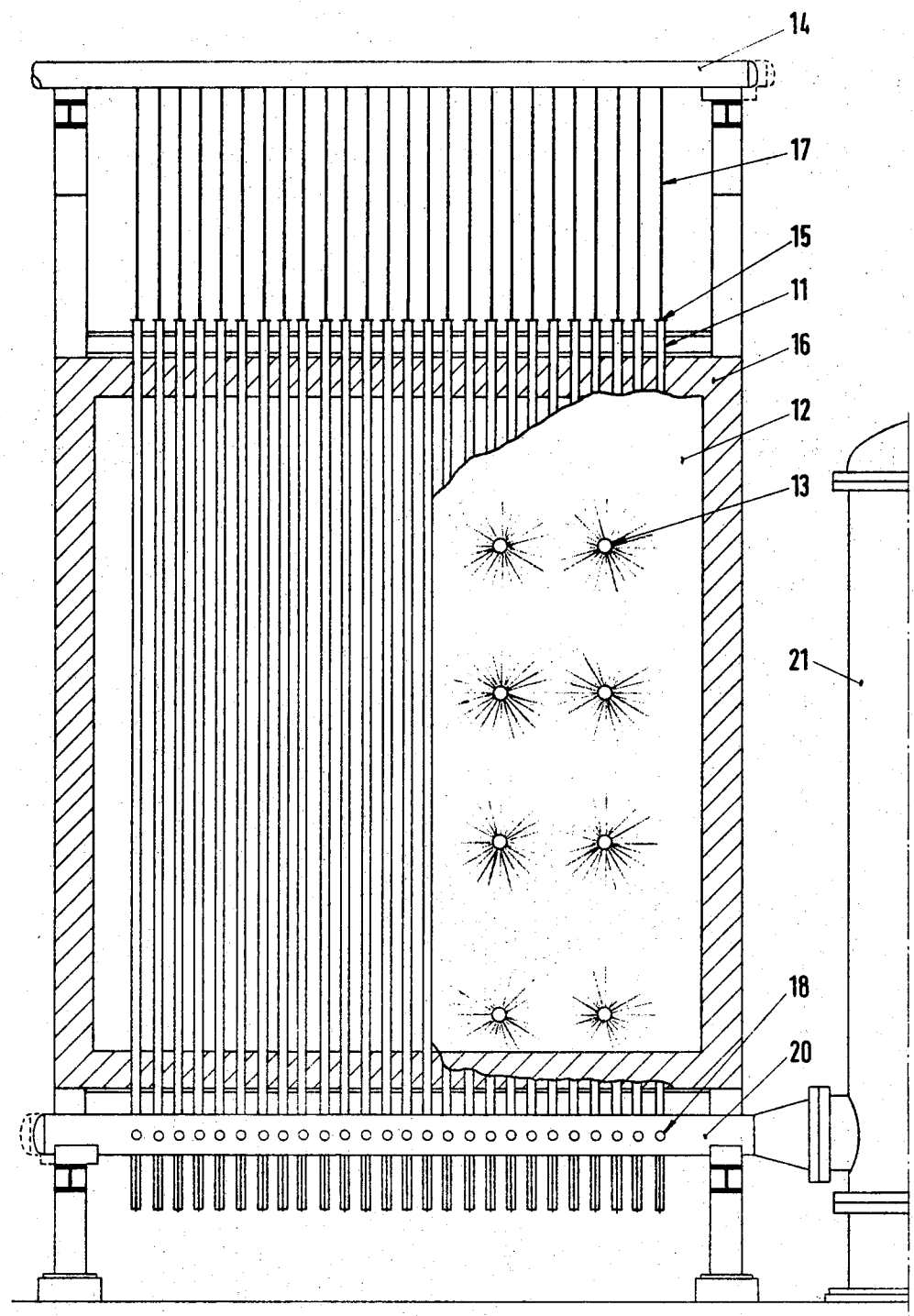
FIG. 2 is a longitudinal section through the furnace of FIG. 1.
Figure 3:
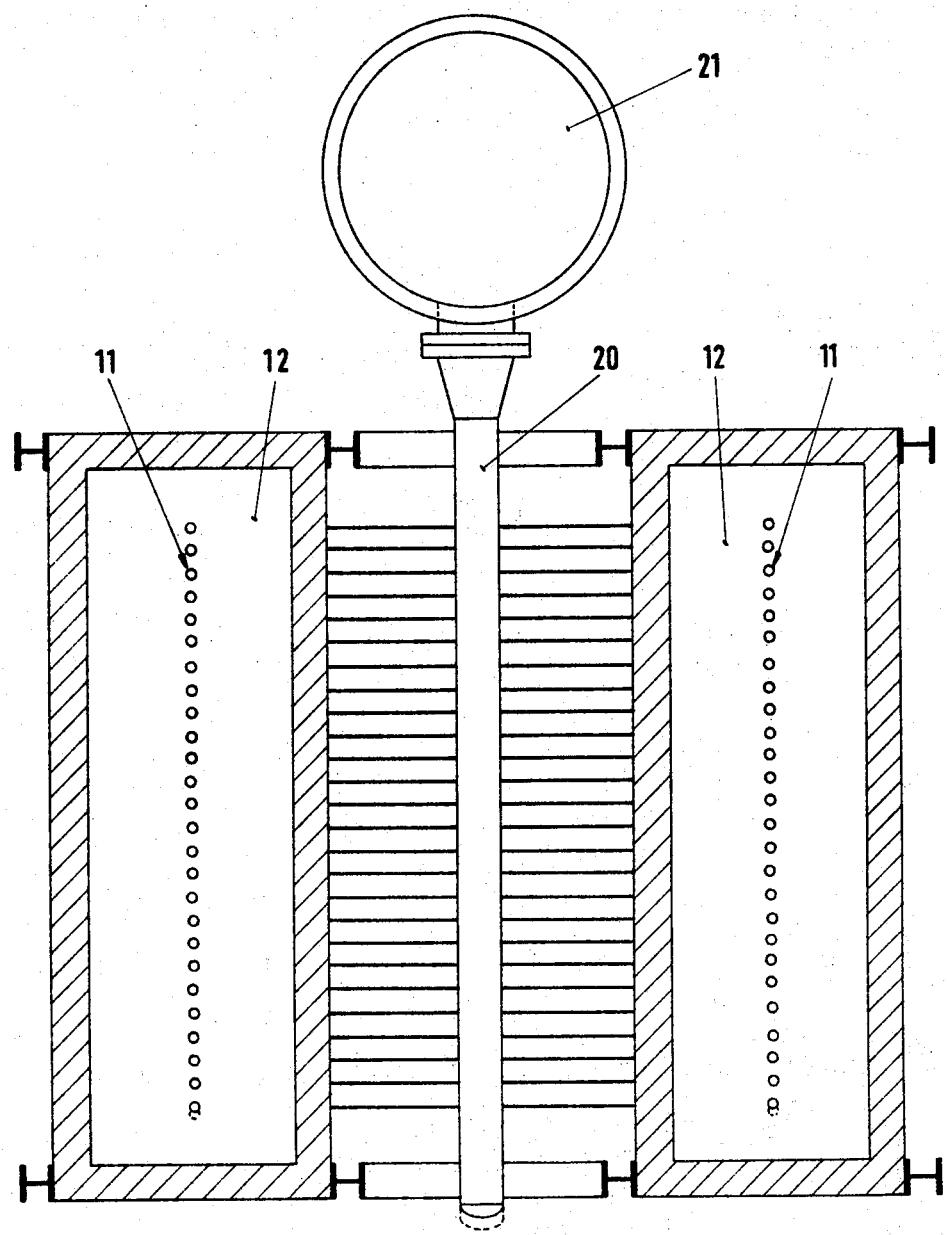
FIG. 3 is a horizontal section through the furnace of FIG. 1.

Referring now to FIGS. 1–3, the reactor tubes 11 are vertically disposed in the combustion chambers 12 with radiant burners 13 for gaseous or liquid hydrocarbon fuels on the chamber walls. The inlet manifold 14 is connected to the tube heads 15 above the chamber roof 16 through inlet pigtails 17. Straight pipes 18 connect the tube bases 19 to the outlet manifold 20. This manifold carries the effluent products to a waste heat boiler 21. In an alternative arrangement the manifold is connected to a vertical transfer line (not shown in the figures) carrying the hot effluent products forward to further processing. The outlet manifold has its fixed point at the entrance to the waste heat boiler 21 or the transfer line (not shown) while the other end of the manifold can expand freely. In order to minimize the frictional forces the manifold rests on sliding supports or on movable suspensions. After having heated the reactor tubes, the combustion products are exhausted from the two chambers 12 through a common duct 22 on the top of the furnace.

The arrangement of the vertical tubes shown in FIGS. 1 to 3 can be slightly modified. Instead of being placed in one row, the tubes can be arranged in two rows with each member of one row being placed opposite the space between two members of the other row. In this way the number of tubes within a certain length of the combustion chamber can be increased and still a fairly good part of the surface of each tube is directly exposed to radiation from the chamber walls.

Figure 4:
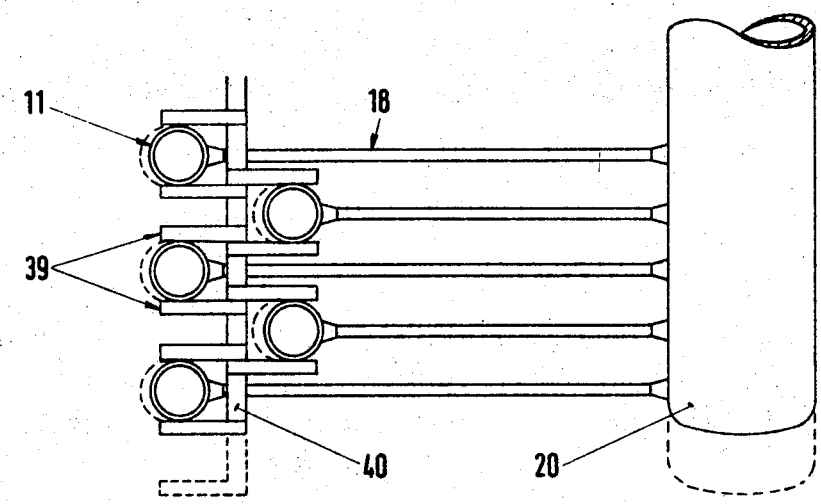
FIG. 4 is a horizontal section through part of the reactor tubes and shows details of an arrangement in which the vertically disposed tubes are in two rows.
Figure 5:
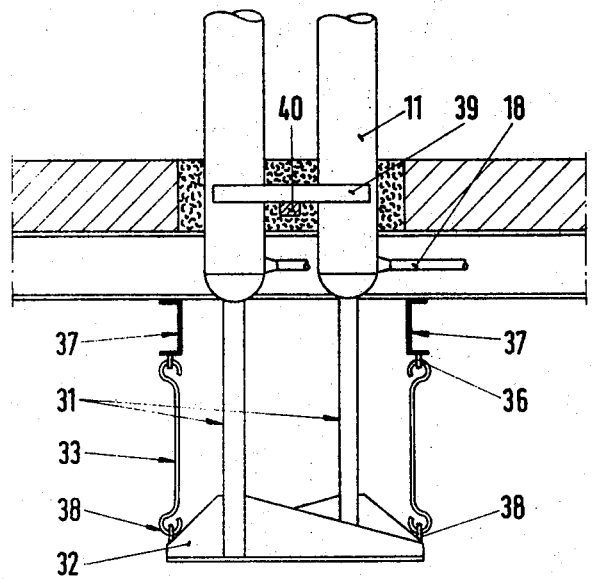
FIG. 5 shows details of an example of a suspension support.
Figure 6:
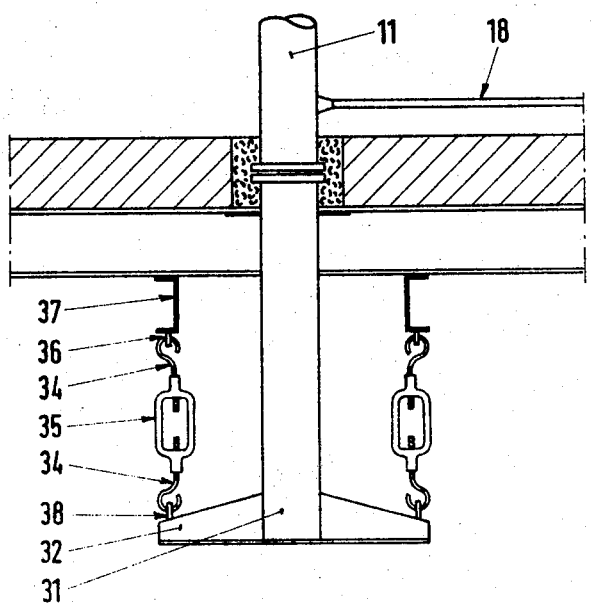
FIG. 6 shows a variation of the outlet arrangement in which the junctions between reactor tubes and connecting pipes are inside the combustion chamber.

FIGS. 4, 5 and 6 show details of a suspension arrangement in accordance with the present invention. The arrangement allows each tube base to move within a substantially plane and horizontal area and thereby compensate for the thermal elongations of manifold and connecting pipes. The details of FIG. 4 and 5 refer to a furnace having two rows of reactor tubes in the same combustion chamber with each member of one row placed opposite the space between two members of the other row, while the details of FIG. 6 refer to a chamber having one row of reactor tubes.

The full load of each reactor tube 11 is carried by a supporting rod 31 resting on a beam 32 which again is carried in a swinging arrangement. This swinging arrangement may comprise simple hangers 33 with hooked ends as shown on FIG. 5. The rods may be replaced by chains. However, in order to obtain the possibility for adjusting the vertical position of the tubes, each hanger may conveniently consist of two hooked rods 34 threaded into a turnbuckle 35 as shown on FIG. 6. The eyes 36 engaging the upper hooked ends of the hangers are welded to structural beams 37, while eyes 38 engaging the lower hooked ends are welded on beam 32.

This suspension support is free of friction and each tube base can be freely displaced in all directions within a restricted area of a nearly horizontal plane. Sidewards displacement along the axis of a connecting pipe 18 is caused by the thermal elongation of this pipe. Longitudinal displacement in a direction parallel to the axis of the manifold 20 is guided by a pair of lugs 39 loosely fitting around the tube. These lugs are secured to a guiding bar 40 placed along the tube row or, in case of two rows, between the rows such as indicated in FIGS. 4 and 5. The gas being transferred from the reactor tubes 11, through the connecting pipes 18, to the manifold 20 will heat the entire system to substantially the same temperature. Consequently, manifold and bar should obtain almost the same thermal expansion. The base of the tube nearest to the fixed point of the manifold is guided so that no longitudinal displacement of this tube base is possible. In this way it is achieved that both ends of all connecting pipes obtain the same longitudinal displacements and no bending stresses are created in the pipes or in their junctions.

Dotted lines in FIG. 4 indicate the longitudinal elongation of manifold 20 and guiding bar 40. The corresponding longitudinal displacement of reactor tubes 11 caused by the elongation of bar 40 and guided by lugs 39 are not shown, however, the sidewards displacements of the reactor tubes 11 caused by the thermal elongation of connecting pipes 18 are indicated in FIG. 4. Elongations of inlet manifold 14 and outlet manifold 20 are also indicated by dotted lines on FIG. 2 and 3.

It will be understood that the axis of the vertically disposed positions depends upon the temperature. However, the tubes can be arranged so that their axes are in truly vertical positions either at ambient temperature or at the maximum operating temperature or at any temperature between these extremes, preferably at a temperature close to the maximum one.

In FIG. 5 the connecting pipes 18 are outside the combustion chamber, while in FIG. 6 they are inside the chamber. Both locations are possible in accordance with the present invention. The inside location of connecting pipes is preferred in cases, where the effluent products from the catalytic endothermic reactor tubes are transferred to further processing in tubes or other reaction system located in the same furnace chamber or in a second furnace chamber in direct communication with the former. In such a situation there is no outlet manifold for collecting the product gas from the catalytic endothermic reactions in the reactor tubes. Consequently, there is no longitudinal displacement of the reactor tubes, and the guiding bar may be omitted. However, the inside location can also be utilized in cases, where the effluent products are transferred to an outlet manifold. In this case each connecting pipe extends through the chamber wall, and a guiding bar attached to the reactor tubes is necessary.

Several endothermic reactions can be conducted in accordance with the present invention. The invention will now be more particularly illustrated by specific examples in which gaseous or liquid hydrocarbons are reacted with steam in the presence of a catalyst.

EXAMPLE 1

A liquid hydrocarbon fraction is reacted with steam for production of a gas containing hydrogen and carbon oxides. The process is conducted in the presence of a nickel catalyst in a furnace similar to the one shown in FIGS. 1 through 3.

There are 50 reactor tubes in one row in each of the two furnace chambers which gives a total length of the outlet manifold 20 of 15 meters. The length of the connecting pipes 18 is 2 meters. Heating of this manifold and pipe arrangement from ambient temperature to 800°C will cause an elongation of each pipe of 29 mm resulting in a sidewards displacement of all tubes. At the same time the total elongation of the manifold will be 220 mm resulting in a longitudinal displacement of the pipe junctions varying with their distance from the fixpoint of the manifold. Junction No. 1 nearest to the fixed point will have practically no displacement while junction No. 50 most distant from the fixed point will be displaced by 220 mm. Since the arrangement of distance pieces between the tube bases will ensure the same longitudinal displacement of the tube junctions there will be no bending stresses in the pipes or in their junctions.

In this example the various operating parameters, such as pressure, steam to carbon ratio, temperature, and hydrocarbon feed, are selected so that the product gas is suitable for further conversion into ammonia synthesis gas. This further conversion takes place in a secondary reformer connected to the fixed point of the outlet manifold 20 through a vertical transfer line (not shown in the figures.).

EXAMPLE 2

A liquid hydrocarbon fraction is converted in the presence of steam for the production of a gas containing olefins, mainly ethylene and propylene. The process is conducted in a furnace similar to the one shown in FIGS. 1 through 3 except that the connecting pipes 18 are kept inside the furnace chamber as shown in detail in FIG. 6. The catalyst is a mixture of oxides including zirconia and potassium oxide. Main operating conditions and dimensions of the apparatus are as in example 1. However, there is no outlet manifold and the pipes 18 are connected to further apparatus located in a second furnace in direct communication with the furnace containing the reactor tubes for the catalytic endothermic reactions. The further apparatus and the second furnace are not shown in the figures since it is not part of the present invention.

What is claimed is:

1. A furnace for catalytic, endothermic reactions, which comprises:
   a. a plurality of substantially vertical reactor tubes arranged in at least one row in at least one furnace chamber;
   b. a plurality of inlet pigtails connected to said plurality of reactor tubes for compensating for thermal expansion of said reactor tubes, one inlet pigtail being for each reactor tube;
   c. outlet means comprising at least one horizontal manifold and a plurality of substantially straight connecting pipes connected to said at least one manifold and at substantially right angles to said reactor tubes, one pipe being for each reactor tube;
   d. suspension means disposed at the lower ends of said reactor tubes for supporting the total weight of said reactor tubes and for securing said lower ends to said furnace for substantially frictionless movement of said lower ends in all directions within a substantially horizontal plane large enough to compensate for the thermal expansion of said outlet means;
   e. guiding means for guiding said reactor tubes at their lower ends in a direction parallel to the length of said at least one manifold; and
   f. means for maintaining said guiding means at substantially the same temperature as said at least one manifold so that said lower ends of said reactor tubes move in accordance with the thermal expansion and contraction of said at least one manifold to which they are connected through said straight connecting pipes.

2. A furnace according to claim 1 comprising means to hold one end of said at least one manifold fixed while permitting said at least one manifold to expand freely in a direction parallel to its length towards its other end.

3. A furnace according to claim 2 wherein said suspension means comprise means for individually supporting the weight of each of said reactor tubes and for individually securing each of said lower ends to said furnace for said substantially frictionless movement.

4. A furnace according to claim 3 wherein said suspension means further comprise means for individually adjusting the position of each of said reactor tubes in the vertical direction.

5. A furnace according to claim 2 wherein said suspension means comprise:
   a. first support means secured to each of said lower ends;
   b. second support means secured to said furnace; and
   c. means for pivotally connecting said first and second support means for said substantially frictionless movement of said lower ends and for supporting said reactor tubes.

6. A furnace according to claim 5 wherein said first support means comprise a plurality of horizontal beams, one for each tube, each having a first plurality of eye-hooks connected thereto, and said second support means comprise a second plurality of eye-hooks.

7. A furnace according to claim 6 wherein said means for pivotably connecting said first and second means comprises a plurality of rods having hooked ends, and wherein each of said beams is positioned so that each of said first plurality of eye-hooks is positioned opposite one of said second plurality of eye-hooks to constitute a plurality of opposed eye-hook pairs, the hooked ends of each of said rods being operative to engage and pivotably connect one of said eye-hook pairs, said first support means further comprising a plurality of supporting rods, one for each reactor tube, for securing said reactor tubes to said horizontal beams.

8. A furnace according to claim 6 wherein each of said beams is positioned so that each of said first plurality of eye-hooks is positioned opposite one of said second plurality of eye-hooks to constitute a plurality of opposed eye-hook pairs, and wherein said means for pivotably connecting said first and second means comprises a plurality of rod pairs and a plurality of turnbuckles, one rod pair being for each turnbuckle, each rod of a pair having a hooked end and a threaded end, the hooked ends of each rod of a rod pair being operative to engage and pivotably connect one of said eye-hook pairs, and the threaded ends of each rod of a rod pair being screwed into opposite ends of one of said turnbuckles.

* * * * *